United States Patent
Sanjurjo et al.

(10) Patent No.: US 9,101,896 B2
(45) Date of Patent: Aug. 11, 2015

(54) HIGH TEMPERATURE DECOMPOSITION OF COMPLEX PRECURSOR SALTS IN A MOLTEN SALT

(75) Inventors: Angel Sanjurjo, San Jose, CA (US);
Kai-Hung Lau, Cupertino, CA (US);
Marc Hornbostel, Palo Alto, CA (US);
Xiaobing Xie, Foster City, CA (US);
Lorenza Moro, San Carlos, CA (US);
Jordi Perez Mariano, Menlo Park, CA (US); Gopala N. Krishnan, Sunnyvale, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 840 days.

(21) Appl. No.: 12/833,635

(22) Filed: Jul. 9, 2010

(65) Prior Publication Data
US 2012/0009116 A1    Jan. 12, 2012

(51) Int. Cl.
*C01D 3/02* (2006.01)
*B01J 19/00* (2006.01)
*B01J 6/00* (2006.01)
*C01B 33/10* (2006.01)
*C01B 33/107* (2006.01)

(52) U.S. Cl.
CPC ............ *B01J 6/007* (2013.01); *C01B 33/10* (2013.01); *C01B 33/10705* (2013.01)

(58) Field of Classification Search
CPC ..... C01B 33/10705; C01B 33/10; B01J 6/007
USPC ................... 423/341, 342, DIG. 12
See application file for complete search history.

(56) References Cited

U.S. PATENT DOCUMENTS

| 4,442,082 A | 4/1984 | Sanjurjo |
| 4,584,181 A | 4/1986 | Nanis et al. |
| 4,590,043 A | 5/1986 | Sanjurjo |
| 7,909,943 B2 * | 3/2011 | Baudis et al. ............. 148/227 |
| 2007/0209945 A1 * | 9/2007 | Karelin et al. ............. 205/615 |
| 2009/0275183 A1 | 11/2009 | Mine et al. |
| 2010/0056353 A1 | 3/2010 | Sanjurjo et al. |

OTHER PUBLICATIONS

PCT Search Report and Written Opinion for PCT/US1143395, Nov. 21, 2011, copy consists of 9 unnumbered pages.

* cited by examiner

*Primary Examiner* — Ngoc-Yen Nguyen
(74) *Attorney, Agent, or Firm* — Richard Aron Osman

(57) ABSTRACT

In one embodiment, the present disclosure relates generally to a method for thermally decomposing a complex precursor salt. In one embodiment, the method includes heating a salt in a reactor until a molten salt is formed, adding the complex precursor salt to the molten salt in the reactor and removing a volatile precursor halide formed from thermal decomposition of the complex precursor salt from the reactor.

6 Claims, 4 Drawing Sheets

HIGH TEMPERATURE DECOMPOSITION OF COMPLEX PRECURSOR SALTS IN A MOLTEN SALT

BACKGROUND

During the production of various metals, a vapor precursor halide is formed by thermal decomposition of a complex precursor salt. It is important to perform the decomposition in a system that is isolated from the atmosphere in order to obtain a volatile precursor halide with the desired purity and to prevent the formation of corrosive species by reaction of the formed precursor halide with water vapor present in the atmosphere. In previous processes, the solid complex precursor salt was heated in a fixed bed batch reactor or a rotary kiln, at approximately 700 degrees Celsius (° C.). These processes presented several limitations. In a fixed bed batch reactor, the heat transfer was limited and there was a considerable amount of down time to load and unload the reactor. On the other hand, using a rotary kiln in the previous process required dynamic hot seals. In addition, the rotary kiln had to be corrosion resistant. Consequently, the high capital cost of the rotary had a strong negative impact on the production cost of the precursor halide.

An additional problem in both previous processes was that the by-products left by the thermal decomposition were in powder or dust form. Thus, the by-products had very low apparent density, were difficult to handle and had low heat transfer properties.

SUMMARY

In one embodiment, the present disclosure relates generally to a method for thermally decomposing a complex precursor salt. In one embodiment, the method includes heating a salt in a reactor until a molten salt is formed, adding the complex precursor salt to the molten salt in the reactor and removing from the reactor a volatile precursor halide formed from thermal decomposition of the complex precursor salt.

In one embodiment, the present disclosure is directed towards a method for thermally decomposing $Na_2SiF_6$. The method comprises heating NaF in a reactor until molten NaF is formed, adding the $Na_2SiF_6$ to the molten NaF in the reactor and removing from the reactor $SiF_4$ gas formed from thermal decomposition of the $Na_2SiF_6$.

In one embodiment, the present disclosure is directed towards a system for thermal decomposition of a complex precursor salt. The system comprises a hopper for storing the complex precursor salt, a reactor coupled to the hopper for heating a salt to form a molten salt and a tank coupled to the reactor for storing a precursor halide from the reactor, wherein the precursor halide is formed from adding the complex precursor salt to the molten salt.

BRIEF DESCRIPTION OF THE DRAWINGS

So that the manner in which the above recited features of the present disclosure can be understood in detail, a more particular description of the disclosure may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

A brief discussion of a process of producing high purity silicon from fluorosilicic acid will aid the reader on understanding a useful application of one embodiment of the present invention. An overall process 100 illustrated in FIG. 1 consists of three major operations which encompass a series of steps. The first major operation includes the step of precipitation of a complex precursor salt, such as for example sodium fluorosilicate ($Na_2SiF_6$), from fluorosilicic acid ($H_2SiF_6$) and a salt, such as for example sodium fluoride (NaF) or sodium chloride (NaCl), followed by generation of a precursor halide, such as for example silicon tetrafluoride gas ($SiF_4$) by thermal decomposition, illustrated as a block of steps 110 in FIG. 1. The precipitation of sodium fluorosilicate from fluorosilicic acid comprises a reaction equation as shown below by Eq. (1) and in sub-step 112 of FIG. 1.

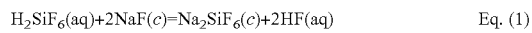

$$H_2SiF_6(aq)+2NaF(c)=Na_2SiF_6(c)+2HF(aq) \qquad \text{Eq. (1)}$$

The sodium fluorosilicate is filter dried in sub-step 114. Since the impurities with higher solubility than $Na_2SiF_6$ remain preferentially in the aqueous solution, the precipitation and filtration of $Na_2SiF_6$ results in a purification step beneficial towards the production of high purity silicon. Subsequently, the sodium fluorosilicate is thermally decomposed in step 116 with heat. The reaction equation for the thermal decomposition of sodium fluorosilicate is shown below by Eq. (2) and in sub-step 116 of FIG. 1.

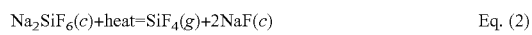

$$Na_2SiF_6(c)+\text{heat}=SiF_4(g)+2NaF(c) \qquad \text{Eq. (2)}$$

The second major operation comprises the reduction of the precursor halide, such as for example silicon tetrafluoride ($SiF_4$) gas, to an elemental material, such as for example silicon (Si), and an ionic halide, such as for example sodium fluoride (NaF). In one embodiment, the $SiF_4$ is reduced by sodium metal (Na) as illustrated by a block of steps 120 in FIG. 1. The reduction of the silicon tetrafluoride gas to silicon is shown below by Eq. (3) and in sub-step 122 of FIG. 1.

$$SiF_4(g)+4Na(s/l/g)=Si(s/l)+4NaF(s/l) \qquad \text{Eq. (3)}$$

Figure 1:
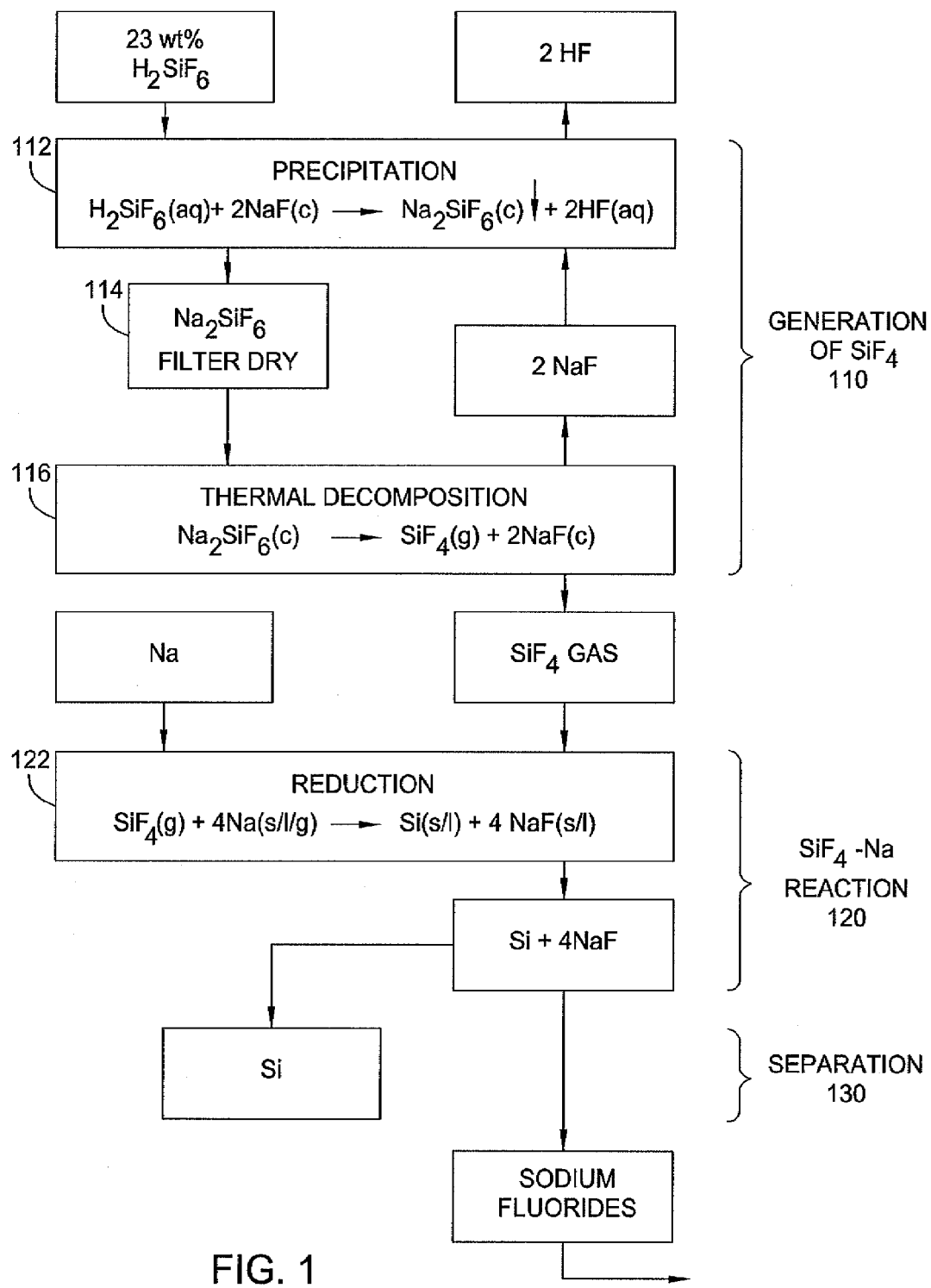
FIG. 1 depicts a flow diagram of one example of a process for producing high purity silicon by a process that may utilize the present invention.

The third major operation involves the separation of the produced elemental material, such as silicon (Si), from the mixture of the element and the ionic halide, such as sodium fluoride (NaF), as shown in a block of steps 130 in FIG. 1. Further details of each of the above identified operations are disclosed in U.S. Pat. Nos. 4,442,082, 4,584,181 and 4,590,043, which are hereby incorporated by reference. Moreover, the above steps are merely provided as an example and are not to be considered limiting. In addition, although the above process is illustrated for the production of pure silicon, the process may be applied to other elemental materials such as boron (B), aluminum (Al), titanium (Ti), vanadium (V), zirconium (Zr), niobium (Nb), molybdenum (Mo), tungsten (W), tantalum (Ta), uranium (U) or plutonium (Pu).

Previously, one way to thermally decompose the complex precursor salt, as illustrated in step 116 of FIG. 1, was to use a fixed bed or a rotary kiln. Using $Na_2SiF_6$ from the above example, solid NaF would be heated in a rotary kiln to approximately 700° C. and $Na_2SiF_6$ would be added. However, the previous process had many drawbacks.

One drawback was that the cost of the equipment needed was very expensive. For example, gas tight seals are needed for the rotary kiln to withstand the high temperatures used in the process. However, the seals needed to be custom ordered for the rotary kilns, which increased the overall cost of the rotary kiln.

In addition, the previous process required additional equipment that is not necessary by the present method and systems. For example, the $SiF_4$ gas that was produced by the previous rotary kiln method was at a low pressure. As a result, additional compressing steps were needed to pressurize the $SiF_4$ gas. Moreover, the compressors had to be built to specification to prevent the $SiF_4$ gas from being exposed to any moisture.

Another drawback is that the previous processes in a fixed bed or a rotary kiln were inefficient. The previous processes were batch processes. As a result, many delays lasting several hours were introduced into the system between each batch, e.g., to heat the rotary kiln for each batch. Also, the by-product solid NaF did not provide very good heat transfer due to its low apparent density.

Yet another drawback was that a by-product of the previous processes was solid NaF left from the rotary kiln. The solid NaF was in a powder or dust form, which is more difficult to handle than bulk dense solid NaF or liquid NaF.

The methods and systems described in the present disclosure have multiple unexpected advantages over previously used methods and systems. For example, the cost of the equipment is lower and the overall cost of the system may be lower because less equipment is necessary than in the previous methods and systems.

Greater efficiency is achieved due to the greater heat transfer between the complex precursor salt and the molten salts compared to the heat transfer between the complex precursor salt and the porous solid salts in the rotary kiln. Moreover, the precursor halide is produced at significantly higher pressures so that no compressors or pumps may even be needed to remove and store the precursor halide. Additional efficiency is achieved by the continuous or semi-continuous process described below versus the batch process previously used.

Figure 2:
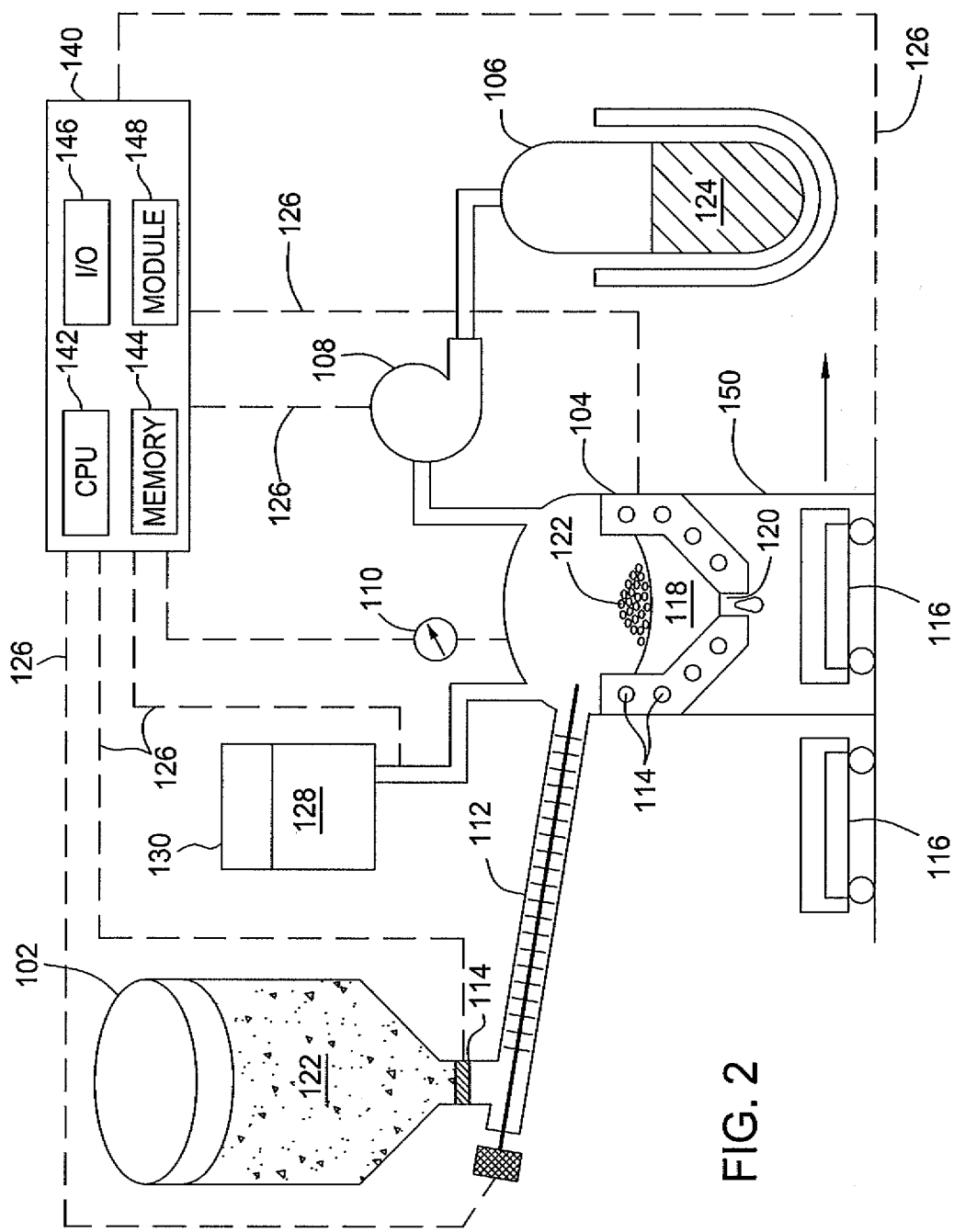
FIG. 2 depicts one embodiment of a system for thermally decomposing a complex precursor salt.

FIG. 2 illustrates one embodiment of a system 200 for thermally decomposing a complex precursor salt. The system 200 may be used in processes to recover various elements such as semiconductors, metals and metalloids. For example, the elements include boron (B), aluminum (Al), silicon (Si), titanium (Ti), vanadium (V), zirconium (Zr), niobium (Nb), molybdenum (Mo), tantalum (Ta) tungsten (W), uranium (U) or plutonium (Pu). The system 200 of FIG. 2 illustrates one example of a process to recover pure Si, as an example. It should be noted that the compounds used in FIG. 2 can be modified to recover any of the elements noted above.

In one embodiment, the system 200 includes a hopper 102 that holds the complex precursor salt 122, e.g., $Na_2SiF_6$. The hopper 102 includes a load lock system 114 that prevents moisture from entering the hopper 102. In addition, the hopper 102 may be heated to ensure that the complex precursor salt 122 is kept dry. In one embodiment, the complex precursor salt 122 is stored in a small pellet or powder form.

A feeder or conveyer 112 is coupled to the hopper 102 to feed the complex precursor salt 122 into the reactor 104. In one embodiment, the feeder 112 is a screw feeder. A load lock system can be used to prevent and minimize the volatile precursor halide from leaking back into the hopper.

The reactor 104 is heated via a heating mechanism 114. In one embodiment, the heating mechanism 114 is heating coils or induction coils. It should be noted that any type of heating mechanism 114 may be used to heat the reactor 104. In one embodiment, the reactor 104 is lined with graphite on the interior side and the exterior side can be Inconel.

The reactor 104 is coupled to a storage tank 130 of a salt 128, e.g., NaF, that feeds the reactor 104. The salt 128 is fed into the reactor 104 and heated to a temperature range of approximately 990° C. to 1400° C. In one embodiment, the reactor 104 is heated to a temperature that is greater than a melting point of the salt 128. In one embodiment, the temperature is approximately 1000° C. As a result, the salt 128 is melted into liquid form to produce a molten salt 118.

The complex precursor salt 122 is added directly onto the molten salt 118 in the reactor 104. A greater amount of heat transfer occurs using the molten salt 118 than the solid salts in the rotary kiln described above due to the greater temperatures and the better heat transfer medium of the molten salt 118. This results in a more efficient production of a precursor halide 124 than in previous employed methods and processes.

For example, using the molten salt 118, the decomposition of the complex precursor salt 122 is approximately 100 times faster than using a solid salt at lower temperatures in a rotary kiln, as described above. Production rates of up approximately 9 kilograms per minute per square meter ($kg \cdot min^{-1} \cdot m^{-2}$) were observed using the molten salt 118. Moreover, the resulting volatile precursor halide 124 is found to have similar purity levels as a precursor halide that is formed using the previous batch processing methods in a rotary kiln. Thus, purity is not sacrificed by the substantial increase in production rates.

In addition, the precursor halide 124, e.g., $SiF_4$ is produced immediately at high pressures. For example, the precursor halide 124 may be produced at pressures from 1 atmospheres (atm) up to 4 atm. As a result, the precursor halide 124 may be cryogenically compressed directly without the need for mechanical compressors and pumps. Thus, pump 108 may be optional to remove the precursor halide 124 from the reactor 104 and to store it in a tank or a container 106. Alternatively, producing the precursor halide at high pressures may eliminate the need for Dewar and liquid nitrogen or other cooling systems to compress the gas.

In another embodiment, the precursor halide can be compressed in the container 106 by physical forces such as a mechanical compressor or a fan, or by cooling in a Dewar, or by a chemical process, such as absorption in an easy to decompose compound.

The reactor 104 also has an opening 120. In one embodiment, the opening 120 is at a bottom of the reactor 104. The molten salt 118 can drain out of the bottom of the reactor 104 into a gas tight storage means 116. For example, the storage means 116 may consist of moveable carts. The molten salt 118 is collected and solidified in the storage means 116 in solid chunks. The dust and powder are trapped and/or dissolved in the molten salt 118. As a result, the dust or powder form of the solidified salt after processing resulting from the previously used methods associated with a rotary kiln is avoided.

The system 200 can be operated continuously or semi-continuously. For example, the molten salt 118 may be continuously drained out of the reactor 104 via the opening 120. The storage means 116 may be a plurality of moveable carts that run underneath the reactor 104. The complex precursor salt 122 and the salt 128 may be added to the reactor 104 as the complex precursor salt 122 is thermally decomposed to form the precursor halide 124 and to replace the lost molten salt 118 as it is drained out of the reactor 104 using a lock and gas tight system 150, where an inert gas such as nitrogen or argon can be used to sweep traces of the volatile gas. Alternatively, cooler NaF powder can be used to absorb traces of the precursor halide.

In addition, the reactor 104 includes a pressurized valve or relief valve 110. As a result, when the pressure of the precursor halide 124 reaches a predefined threshold, e.g., 1 atm, the precursor halide 124 is removed from the reactor 104 and stored.

In one embodiment, the system 200 may be automated. A controller 140 may be coupled to one or more of the pieces of equipment via control signal lines 126 in the system 200. In one embodiment, the controller 140 may be coupled to the load lock 114 of the hopper 102, the storage tank 130, the feeder 112, the pressurized valve 110, the heating mechanism 114, the pump 108 and the storage means 116.

As a result, the controller 140 may monitor one or more parameters of the system 200 to ensure that the system 200 operates continuously or semi-continuously. For example, the controller 140 can monitor the amount of molten salt 118 or the amount of complex precursor salt 122 in the reactor 104. When the amounts fall below a predefined threshold, the controller 140 may send a signal to open the load lock 114 and the feeder 112 to feed more complex precursor salt 122 to the reactor 104 or to the storage tank 130 to add more of the salt 128. In other words, the controller 140 can control a rate of feed of the complex precursor salt 122 and/or the salt 128.

In another example, the controller 140 can monitor the pressure of the reactor 104. When the pressure exceeds a predefined threshold, the controller 140 can send a signal to the valve 110 to release the precursor halide 124 and/or to the pump 108 (if used) to pump the precursor halide 124 out of the reactor 104. The controller 140 may also control the movement of the storage means 116 as each storage means 116 is filled with the molten salt 118 draining from the reactor 104.

The controller 140 comprises a processor 142 (e.g., a CPU), a memory 144, e.g., random access memory (RAM) and/or read only memory (ROM), various input/output devices 146 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)) and a module 148 containing automated logic or computer readable code for monitoring various parameters of the system 200 and operating various pieces of equipment of system 200 based upon the monitored parameters.

In one embodiment, the automated logic or computer readable code in module 148 for monitoring various parameters of the system 200 and operating various pieces of equipment of system 200 based upon the monitored parameters can be loaded into memory 144 and executed by processor 142 to implement the functions as discussed above. As such, the automated logic or computer readable code in module 148 for monitoring various parameters of the system 200 and operating various pieces of equipment of system 200 based upon the monitored parameters of the present disclosure can be stored on a computer readable storage medium, e.g., RAM memory, magnetic or optical drive or diskette and the like.

Figure 3:
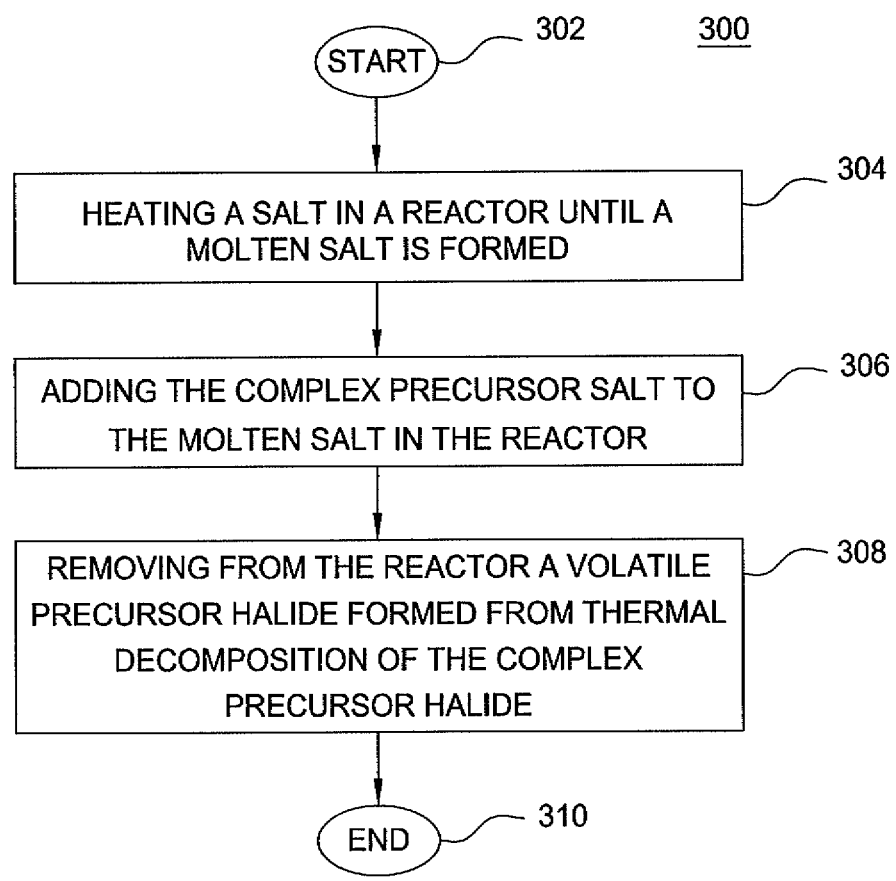
FIG. 3 depicts a flow diagram of one embodiment of a method for thermally decomposing a complex precursor salt.

FIG. 3 illustrates a flow diagram of one embodiment of a method 300 for thermally decomposing a complex precursor salt. In one embodiment, the method 300 may be executed automatically by the controller 140 in communication with the various components of the system 200.

The method 300 begins at step 302. At step 304, the method 300 heats a salt in a reactor until a molten salt is formed. In one embodiment, the salt is NaF and the molten salt is molten NaF.

The salt is heated to a temperature between 990° C. and 1400° C. In one embodiment the salt is heated to a temperature that is greater than a melting point of the salt. In one embodiment, the temperature is approximately 1000° C.

At step 306, the method 300 adds the complex precursor salt to the molten salt in the reactor. In one embodiment, the complex precursor salt is $Na_2SiF_6$. The complex precursor salt may be added in a solid pellet form.

At step 308, the method 300 removes from the reactor a volatile precursor halide formed from the thermal decomposition of the complex precursor salt. In one embodiment, the precursor halide is $SiF_4$. As discussed above, when the complex precursor salt is added directly to the molten salt, the precursor halide is immediately formed. In addition, the precursor halide is formed at high pressures. As a result, the precursor halide may be cryogenically compressed directly without the need for mechanical compressors and pumps. Alternatively, producing the precursor halide at high pressures may eliminate the need for Dewar and liquid nitrogen or other cooling systems to compress the gas.

In addition, the method 300 can be run continuously or semi-continuously. For example, the molten salt may be continuously drained out of the reactor as the complex precursor salt is added and then replenished. The method 300 ends at step 310.

Figure 4:
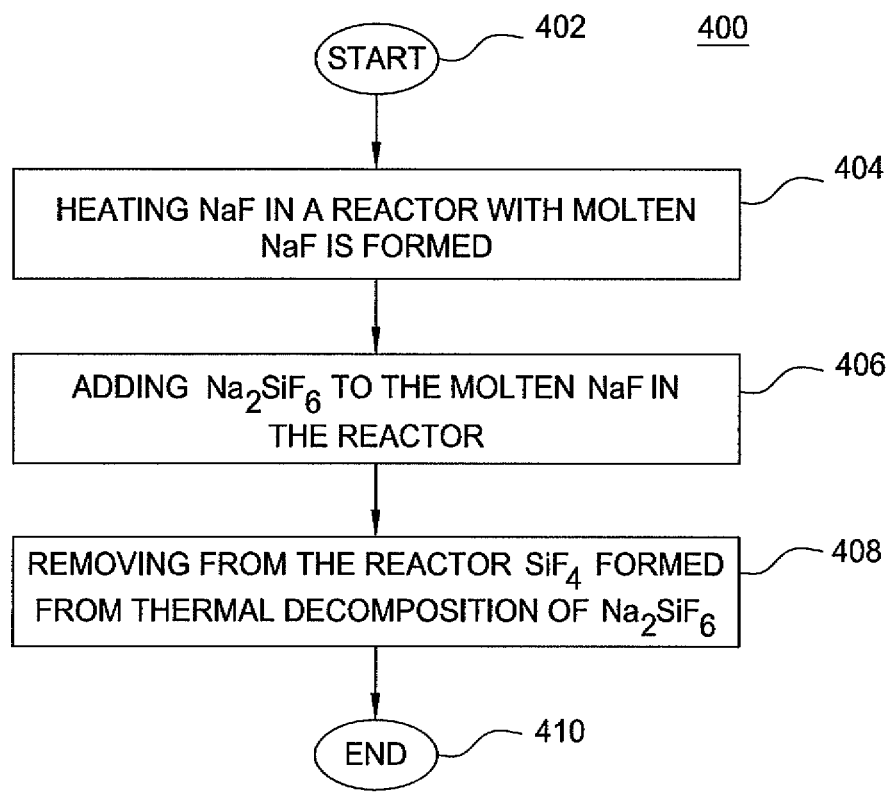
FIG. 4 depicts a flow diagram of a one embodiment of a method for thermally decomposing $Na_2SiF_6$.

FIG. 4 illustrates a flow diagram of one embodiment of a method 400 for thermally decomposing $Na_2SiF_6$. In one embodiment, the method 400 may be executed automatically by the controller 140 in communication with the various components of the system 200.

The method 400 begins at step 402. At step 404, the method 400 heats NaF in a reactor until molten NaF is formed. The NaF is heated to a temperature between 990° C. and 1400° C. In one embodiment, the NaF is heated to a temperature of approximately 1000° C.

At step 406, the method 400 adds the $Na_2SiF_6$ to the molten NaF in the reactor. The $Na_2SiF_6$ may be added in a solid pellet form.

At step 408, the method 400 removes from the reactor $SiF_4$ gas formed from the thermal decomposition of the $Na_2SiF_6$. As discussed above, when the $Na_2SiF_6$ is added directly to the molten NaF, the $SiF_4$ is immediately formed. In addition, the $SiF_4$ is formed at very high pressures. As a result, the cost requirements for compression before storage are significantly reduced.

In addition, the method 400 can be run continuously or semi-continuously. For example, the molten salt may be continuously drained out of the reactor as the complex precursor salt is added and then replenished. The method 400 ends at step 410.

In case of $TiF_4$, $Zr_4$, $AlF_3$, etc. that are solids at room temperature, the volatile vapors can be condensed on a surface (or own powders). The powders can be then mechanically retrieved and fed to the reactor for production of the corresponding metal.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A continuous or semi-continuous method for thermally decomposing $Na_2SiF_6$, comprising:
   feeding a salt composition consisting of NaF into a reactor;
   heating the reactor to a temperature between 990 and 1400° C., wherein the NaF melts to molten NaF; then
   directly adding a precursor salt composition consisting of $Na_2SiF_6$ to the molten NaF in the reactor, wherein the $Na_2SiF_6$ thermally decomposes to NaF and $SiF_4$ gas, wherein the $SiF_4$ gas is produced at a pressure between 1 and 4 atmosphere (atm).

2. The method of claim 1 further comprising the subsequent step of removing resultant $SiF_4$ gas from the reactor.

3. The method of claim 1 further comprising the subsequent step of removing molten NaF from the reactor.

4. The method of claim 1, the method achieving a production rate of 9 kilograms $SiF_4$ per minute per square meter ($kg \cdot min^{-1} \cdot m^{-2}$).

5. The method of claim 1 further comprising the subsequent step of removing resultant $SiF_4$ gas from the reactor and the subsequent step of removing molten NaF from the reactor, wherein the method is a continuous process, wherein the molten salt is continuously drained from the reactor, and the precursor salt composition and the salt composition are added to the reactor as the resultant $SiF_4$ gas and NaF are removed.

6. The method of claim 1 further comprising the subsequent step of removing resultant $SiF_4$ gas from the reactor and the subsequent step of removing molten NaF from the reactor, wherein the method is a continuous process, wherein the molten salt is continuously drained from the reactor, and the precursor salt composition and the salt composition are added to the reactor as the resultant $SiF_4$ gas and NaF are removed, the method achieving a production rate of 9 kilograms $SiF_4$ per minute per square meter ($kg \cdot min^{-1} \cdot m^{-2}$).

* * * * *